(12) United States Patent
Goto et al.

(10) Patent No.: US 8,711,667 B2
(45) Date of Patent: Apr. 29, 2014

(54) RECORDING DEVICE, RECORDING METHOD, AND PROGRAM

(75) Inventors: Takashi Goto, Saitama (JP); Yoshiyuki Miyamoto, Kanagawa (JP); Takashi Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 13/104,358

(22) Filed: May 10, 2011

(65) Prior Publication Data

US 2011/0305129 A1    Dec. 15, 2011

(30) Foreign Application Priority Data

Jun. 11, 2010   (JP) .................................. 2010-133588

(51) Int. Cl.
*G11B 19/24* (2006.01)

(52) U.S. Cl.
USPC ........................................................ 369/239

(58) Field of Classification Search
None
See application file for complete search history.

(56) References Cited

U.S. PATENT DOCUMENTS

| | | | |
|---|---|---|---|
| 7,440,372 B2 * | 10/2008 | Nakano et al. ............. 369/53.12 |
| 2001/0003519 A1 | 6/2001 | Tsukihashi |
| 2003/0067853 A1 | 4/2003 | Wang et al. |
| 2004/0240354 A1 | 12/2004 | Furukawa et al. |
| 2007/0081434 A1 | 4/2007 | Wang et al. |
| 2008/0130439 A1 | 6/2008 | Fan et al. |

FOREIGN PATENT DOCUMENTS

| | | |
|---|---|---|
| EP | 1 434 217 A2 | 6/2004 |
| JP | 2006-244670 | 9/2006 |
| JP | 2006-344299 | 12/2006 |

OTHER PUBLICATIONS

Extended European Search Report issued Sep. 21, 2011 in Patent Application No. 11168237.3

* cited by examiner

*Primary Examiner* — Joseph Feild
*Assistant Examiner* — Parul Gupta
(74) *Attorney, Agent, or Firm* — Oblon, Spivak, McClelland, Maier & Neustadt, L.L.P.

(57) ABSTRACT

A recording device includes: a recording and reproducing unit that records or reproduces data stored on a recording medium; and a control unit that interrupts recording during recording performed by the recording and reproducing unit, acquires an evaluation value of a recording quality of a recorded portion, changes recording speed based on the evaluation value, and resuming the recording.

13 Claims, 10 Drawing Sheets

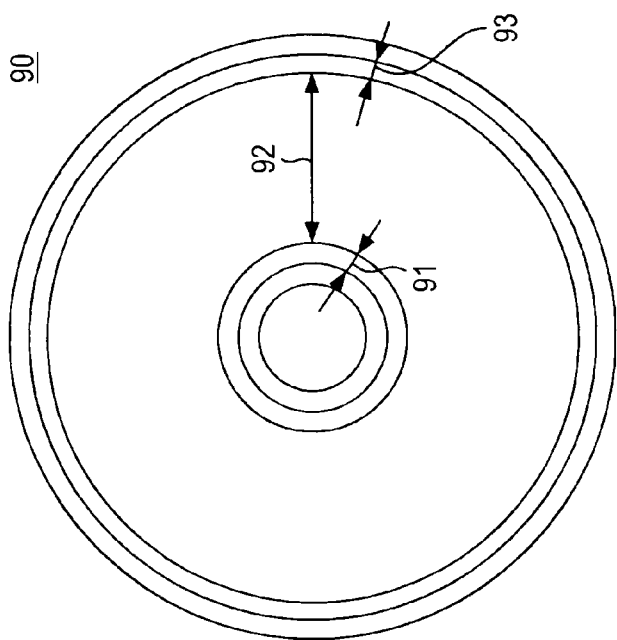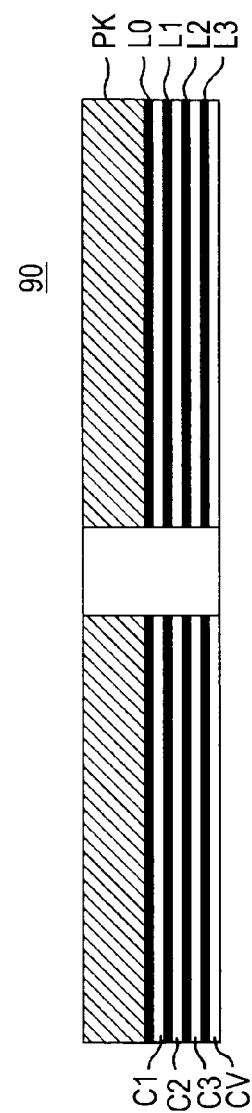

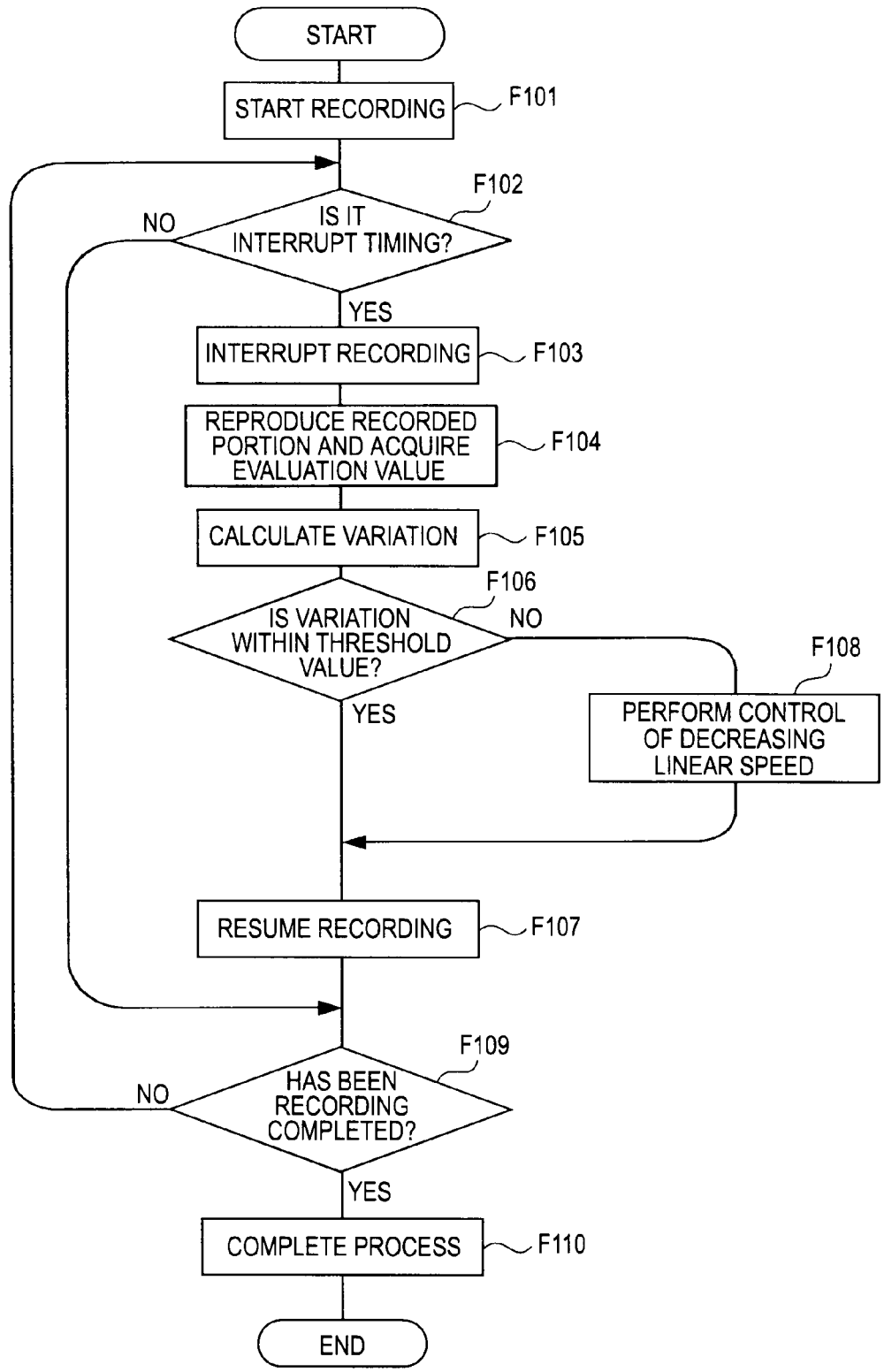

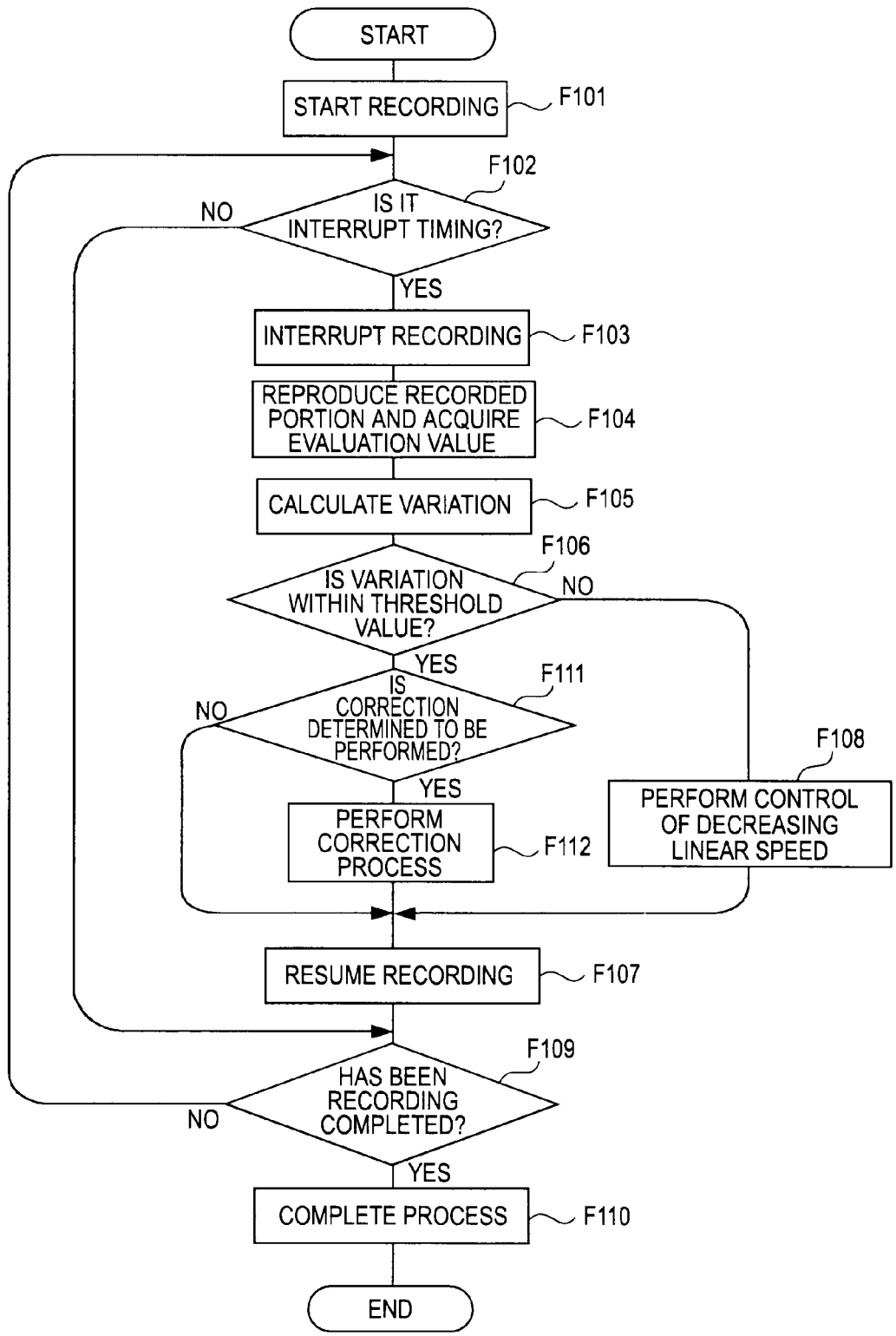

THIRD EMBODIMENT

FOURTH EMBODIMENT

FIFTH EMBODIMENT

SIXTH EMBODIMENT

EIGHTH EMBODIMENT

RECORDING DEVICE, RECORDING METHOD, AND PROGRAM

BACKGROUND

The present disclosure relates to a recording device and a recording method for performing optical recording for a recording medium such as an optical disc and a program that implements the recording device and the recording method.

Various types of recordable optical recording media such as a write-once-type optical disc and a rewritable optical disc are known.

For example, there are a CD-R (Compact Disc-Recordable), a CD-RW (Compact Disc-Rewritable), a DVD-R (Digital Versatile Disc-Recordable), a DVD-RW (Digital Versatile Disc-Re-recordable), a DVD+R (Digital Versatile Disc+Recordable), a DVD+RW (Digital Versatile Disc+Rewritable), a DVD-RAM (Digital Versatile Disc-Random Access Memory), a BD-R (Blu-ray Disc-Recordable), a BD-RE (Blu-ray Disc-Rewritable), and the like.

In optical recording/reproducing devices that record data on such optical recording media, in order to maintain a good recording quality, it is necessary to control variations in various recording characteristics such as the amplitude state of an RF signal, the jitter, or an error rate that are evaluated based on the $\beta$ value of the RF signal, the asymmetry, the degree of modulation, and the like to be small.

SUMMARY

However, for example, due to various factors during recording, a variation in the RF signal acquired when the optical recording medium after recording is reproduced occurs.

As examples of such factors, there are factors caused by the recording medium such as variations in the medium characteristics for each manufacturer of optical recording media, warping in the radial direction or the tangential direction, face blurring, nonuniformity of sensitivity, distortion, eccentricity, mass eccentricity, and birefringence.

In addition, there are factors caused by a recording device side such as servo characteristics, tilt adjustment error, machanical assembly error, variations in viewing field characteristics, stray light, optical aberration of an optical pickup, remaining perturbations after adjustment of various perturbations, laser beams, electrical offset in an LSI or an electric circuit, and the like.

In addition, there are factors caused by environmental variation factors such as an increase in the temperature inside a device, a change over time, temperature, and humidity.

These various variation factors often have more influence in accordance with an increase in the reproduction linear speed. When these variations are greater than the limit of the system margin, an RF signal may be generated in which it is difficult to correct data.

Regarding such a problem, in JP-A-2006-244670, a method is disclosed in which the jitter of an RF signal is measured when an optical recording/reproducing device reproduces an optical recording medium after recording, and the recording speed is limited in a case where the jitter exceeds a threshold value.

However, according to this method, since the determination is made based on an absolute value, it is difficult to absorb a device difference of measured values of jitters or measurement error between devices or a difference between recording media. In addition, it is difficult to set a threshold value.

In addition, in JP-A-2006-344299, a method is disclosed in which the amount of variation in a control signal of a device before recording is detected, and a recording speed is limited. However, it is difficult to suppress the variations in an RF signal after recording due to nonuniformity of sensitivity of the recording medium or the like.

Furthermore, it is difficult to instantly adapt a recording operation in accordance with various variation factors that are generated during a recording operation.

Thus, it is desirable to stabilize the recording quality by adapting a recording operation in accordance with the variation factors of various RF signals that are possibly generated during a recording operation.

According to an embodiment of present disclosure, there is provided a recording device including: a recording and reproducing unit that records or reproduces data stored on a recording medium; and a control unit that interrupts recording during recording performed by the recording and reproducing unit, acquires an evaluation value of a recording quality of a recorded portion, changes recording speed based on the evaluation value, and resuming the recording.

The above-described control unit may decrease the recording speed of the recording and reproducing unit and resume the recording in a case where a variation of the recording quality on the basis of the evaluation value is out of a predetermined range.

On the other hand, the above-described control unit may increase the recording speed of the recording and reproducing unit and resume the recording in a case where the variation of the recording quality on the basis of the evaluation value is within the predetermined range. Alternatively, in the case, the control unit may correct a recording operation of the recording and reproducing unit and resume the operation.

In addition, the above-described control unit, in a case where the variation of the recording quality on the basis of the evaluation value is out of the predetermined range, may decrease the recording speed of the recording and reproducing unit and resume the recording in a case where the recording before the interrupt is not performed at a lowest recording speed, and end the recording of the recording and reproducing unit in a case where the recording before the interrupt is performed at the lowest recording speed. Alternatively, the control unit may perform a notification of an abnormal state for a host device connected thereto instead of ending the recording of the recording and reproducing unit.

In addition, the above-described control unit may increase the recording speed of the recording and reproducing unit and resume the recording operation in a case where the variation of the recording quality on the basis of the evaluation value is within the predetermined range.

On the other hand, the above-described control unit may correct the recording operation of the recording and reproducing unit and resume the recording in a case where the variation of the recording quality on the basis of the evaluation value is out of the predetermined range.

In addition, the above-described control unit, in order to determine timing for interrupting the recording during the recording, may monitor at least one of an amount of recorded data, an address of recording data, a recording position located on the optical recording medium, recording time, temperature, a correction value for each of various radiuses (the amount of tilt correction, the amount of aberration correction, or the like), recording laser power, and a servo state during the recording.

In addition, the above-described control unit may acquire at least one of a jitter value, an error rate, a $\beta$ value, a degree of modulation, asymmetry, an amplitude of an RF signal, and an aperture ratio as the evaluation value.

In addition, the above-described recording device may further include a memory unit that stores therein a threshold value used for determining whether or not the variation of the recording quality on the basis of the evaluation value is within the predetermined range, wherein the control unit performs the determination by using the acquired evaluation value and the threshold value.

Alternatively, the above-described control unit may acquire a threshold value used for determining whether or not the variation of the recording quality on the basis of the evaluation value is within a predetermined range from a part of an area of the recording medium as a recording target or a memory unit of any other device connected thereto and perform the determination by using the evaluation value and the threshold value.

According to another embodiment of the present disclosure, there is provided a recording method including the steps of: recording data on a recording medium; interrupting the recording during recording; acquiring an evaluation value of a recording quality; changing recording speed based on the evaluation value; and resuming the recording.

According to still another embodiment of the present disclosure, there is provided a non-volatile readable recording medium having thereon a program that allows an operation processing device to perform the steps of: recording data on a recording medium; interrupting the recording during recording; acquiring an evaluation value of a recording quality; changing recording speed based on the evaluation value; and resuming the recording.

In the embodiments of the present disclosure, during recording data on a recording medium, the recording operation is interrupted at predetermined interrupt timing, a recorded portion is reproduced, and an evaluation value of the recording quality is acquired. Then, based on a determination of the recording quality using the evaluation value, the recording linear speed is changed, and the recording operation is resumed. For example, in a case where the degradation of the quality is large, the recording linear speed is decreased. In addition, there is a case where the recording operation is corrected. Alternatively, in a case where there is no or a little degradation of the quality, the recording linear speed is increased. In addition, there is a case where the recording operation is corrected.

By performing the above-described operation while interrupting a recording operation in the middle of the operation, the recording operation can be adapted in correspondence with various variation factors of an RF signal.

According to the embodiment of the present disclosure, the recording operation can be adapted to various factors by changing the recording linear speed, whereby the stabilization of the recording quality can be realized by using a simple technique. By stabilizing the recording quality, a decrease in the occurrence of error during recording or reproduction, stabilization of the operation during the reproduction owing to a stabilized servo state, and the like are realized, whereby the performance of the recording and reproducing operation is improved.

BRIEF DESCRIPTION OF THE DRAWINGS

FIGS. 2A and 2B are diagrams illustrating an optical disc as a recording target of an embodiment.

FIG. 3 is a flowchart of a recording process according to a first embodiment.

FIG. 4 is a flowchart of a recording process according to a second embodiment.

DESCRIPTION OF EMBODIMENTS

Figure 1:
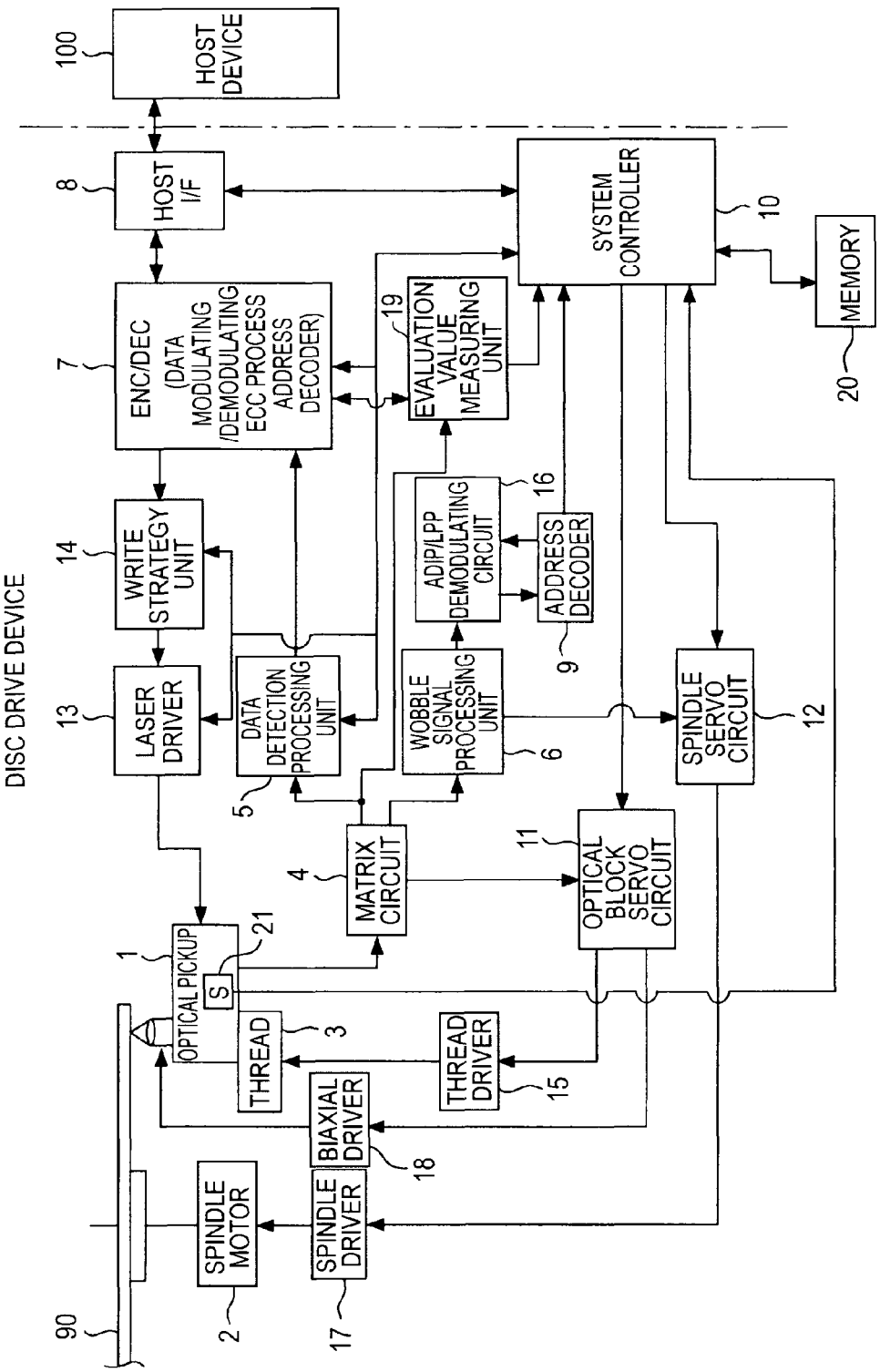
FIG. 1 is a block diagram of a disc drive device according to an embodiment of the present disclosure.

Hereinafter, embodiments of the present disclosure will be described in the following order.
1. Configuration of Disc Drive Device
2. First Embodiment
3. Second Embodiment
4. Third Embodiment
5. Fourth Embodiment
6. Fifth Embodiment
7. Sixth Embodiment
8. Seventh Embodiment
9. Eight Embodiment
10. Modified Example
11. Program 1. Configuration of Disc Drive Device FIG. 1 illustrates the configuration of a disc drive device as a recording device according to an embodiment of the present disclosure.

The disc drive device according to this embodiment, for example, is a recording/reproducing device that records and reproduces data on an optical disc such as a Blu-ray disc (registered trademark) or a DVD (Digital Versatile Disc).

When an optical disc 90 such as a Blu-ray disc or a DVD is loaded into the disc drive device, the optical disc is loaded on a turn table not shown in the figure. The optical disc 90 is driven so as to turn at a constant linear velocity (CLV) or a constant angular velocity (CAV) by a spindle motor 2 during a recording/reproduction operation.

During reproduction, mark information recorded on tracks formed on the optical disc 90 is read out by an optical pickup 1.

On the other hand, when data is recorded on the optical disc 90, user data is recorded on the tracks formed on the optical disc 90 as a phase change mark or a pigment change mark by the optical pickup 1.

In addition, in the inner circumferential area and the like of the optical disc 90, as reproduction-dedicated management information, for example, physical information and the like of the disc is recorded as embossed pits or wobbling grooves. The read-out of the information is also performed by the optical pickup 1.

Furthermore, ADIP (Address in Pregroove) information or LPP (Land Pre Pit) information that is embedded as the wobbling of the groove track on the optical disc 90 is read out by the optical pickup 1.

Inside the optical pickup 1, a laser diode that serves as a laser beam source; a photodetector that is used for detecting reflection light; an objective lens that is the output end of the laser beam; and an optical system that irradiates a disk recording surface with the laser beam through an objective lens and guides the reflection light thereof to the photodetector, and the like are formed.

The objective lens is held inside the optical pickup 1 using a biaxial mechanism so as to be movable in the tracking direction and the focus direction.

In addition, the entire optical pickup 1 is movable in the radial direction of the disc using a thread mechanism 3.

Furthermore, the laser diode of the optical pickup 1 is driven so as to emit laser beams in accordance with a drive signal (drive current) that is transmitted from the laser driver 13.

In addition, inside the optical pickup 1, a temperature sensor 21, for example, using a thermistor or the like is disposed so as to detect temperature information. The detected temperature information is supplied to a system controller 10. Accordingly, the system controller 10 can acquire the temperature information during recording.

The information on the reflection light reflected from the disc 90 is detected by the photodetector and is converted into an electric signal according to the intensity of the received light so as to be supplied to a matrix circuit 4.

The matrix circuit 4 includes a current-to-voltage conversion circuit, a matrix calculation/amplification circuit, and the like in correspondence with output currents that are output from a plurality of light receiving devices as photodetectors. The matrix circuit 4 generates a necessary signal through a matrix calculation process.

For example, the matrix circuit 4 generates a reproduction information signal (RF signal), a focus error signal that is used for servo control, a tracking error signal, and the like.

In addition, the matrix circuit 4 generates a push-pull signal as a signal relating to the wobbling of the groove, that is, a signal used for detecting the wobbling.

The RF signal output from the matrix circuit 4 is supplied to a data detection processing unit 5 and an evaluation value measuring unit 19, the focus error signal and the tracking error signal are supplied to an optical block servo circuit 11, and the push-pull signal is supplied to a wobble signal processing circuit 15.

Here, the matrix circuit 4 may be disposed inside the optical pickup 1.

The data detection processing unit 5 performs a binarization process for the RF signal.

For example, the data detection processing unit 5 performs an A/D conversion process of the RF signal, a reproduction clock generating process using a PLL, a PR (Partial Response) equalizing process, a Viterbi decoding process (maximum-likelihood decoding method), and the like and acquires a binary data array through a partial response maximum-likelihood decoding process (PRML detecting method).

Then, the data detection processing unit 5 supplies the binary data array as information readout from the optical disc 90 to an encoding/decoding unit 7 that is disposed on the latter stage.

The encoding/decoding unit 7 performs a demodulating process of reproduction data during reproduction and performs a modulation process of recording data during recording. In other words, the encoding/decoding unit 7 performs a data demodulating process, a de-interleaving process, an ECC decoding process, an address decoding process, and the like during reproduction, and performs an ECC encoding process, an interleaving process, a data modulating process, and the like during recording.

During reproduction, the binary data array that is decoded by the data detection processing unit 5 is supplied to the encoding/decoding unit 7. The encoding/decoding unit 7 acquires the reproduction data from the optical disc 90 by performing the demodulating process of the binary data array.

The encoding/decoding unit 7 performs a demodulating process, an ECC decoding process as an error correcting process, and the like for data, for example, for which a run-length limited code modulating process is performed and recorded on the optical disc 90, thereby acquiring reproduction data from the optical disc 90.

The data decoded as the reproduction data by the encoding/decoding unit 7 is transferred to a host interface 8 and is transferred to the host device 100 based on an instruction of the system controller 10. Here, the host device 100 is, for example, a computer device, an AV (Audio-Visual) system device, or the like.

When data is recorded on or reproduced from the optical disc 90, ADIP/LPP information is processed.

In other words, the push-pull signal that is output from the matrix circuit 4 as a signal relating to the wobbling of the groove formed as digitalized wobble data by the wobble signal processing circuit 6. In addition, through the PLL process, a clock that is synchronized with the push-pull signal is generated.

The wobble data is demodulated to be a data stream configuring an ADIP address using the ADIP/LPP demodulating circuit 16 and is supplied to an address decoder 9.

The address decoder 9 decodes the supplied data so as to acquire an address value and supplies the address value to the system controller 10.

During recoding, the host device 100 supplies recording data to the encoding/decoding unit through the host interface 8.

In this case, the encoding/decoding unit 7 performs an error correction code adding (ECC encoding) process, an interleaving process, a sub-code adding process, or the like as the encoding process of the recording data. In addition, the encoding/decoding unit 7 performs a run-length limited code modulating process for the data for which such a process has been performed.

The recording data processed by the encoding/decoding unit 7 is formed as a laser driving pulse by a write strategy unit 14 and is supplied to the laser driver 13. When the recording data is formed as a laser driving pulse, the write strategy unit 14 also performs a recording compensation process such as fine adjustment of optimal recording power, adjustment of a pulse waveform, or the like of the laser driving pule for the characteristics of the recording layer, the spot shape of a laser beam, the recording linear speed, and the like.

Then, the laser driver 13 supplies the laser driving pulse for which the recording compensation process has been performed to the laser diode disposed inside the optical pickup so as to perform the driving of laser beam emission. Accordingly, a mark corresponding to the recording data is formed on the optical disc 90.

In addition, the laser driver 13 includes a so-called APC (Auto Power Control) circuit, and controls the output of the laser beam so as to be constant without being dependent on the temperature or the like while monitoring the laser output power based on the output of a laser power monitoring detector disposed inside the optical pickup 1.

The target values of the laser output levels during recording and during reproduction are given from the system controller 10. The system controller 10 controls the laser output levels during recording and during reproduction to be the target values of the laser output levels during recording and during reproduction.

The optical block servo circuit 11 generates various servo drive signals such as a focus signal, a tracking signal, and a thread signal based on the focus error signal and the tracking error signal transmitted from the matrix circuit 4 so as to allow a servo operation to be performed.

In other words, the optical block servo circuit 11 generates a focus drive signal and a tracking drive signal in accordance with the focus error signal and the tracking error signal and drives a focus coil and a tracking coil of the biaxial mechanism disposed inside the optical pickup 1 by using the biaxial driver 18. Accordingly, a tracking servo loop and a focus servo loop are formed by the optical pickup 1, the matrix circuit 4, the optical block servo circuit 11, the biaxial driver 18, and the biaxial mechanism.

In addition, the optical block servo circuit 11 performs a track jumping operation by turning off the tracking servo loop and outputting a jump drive signal in accordance with a track jumping instruction transmitted from the system controller 10.

Furthermore, the optical block servo circuit 11 drives the thread mechanism 3 using the thread driver 19 by generating a thread drive signal based on the thread error signal acquired as a low band component of the tracking error signal or access control of the system controller 10, and the like. The thread mechanism 3, although not shown in the figure, includes a main shaft that holds the optical pickup 1, a thread motor, and a mechanism configured by a transfer gear and the like. The thread mechanism 3 drives the thread motor in accordance with the thread drive signal, thereby performing a sliding movement that is necessary for the optical pickup 1.

The spindle servo circuit 12 controls the spindle motor 2 so as to perform CLV rotation or CAV rotation.

For example, the spindle servo circuit 12 generates a spindle error signal by acquiring a clock that is generated through a PLL process for the wobble signal as the current rotation speed information of the spindle motor 2 and comparing the rotation speed information with predetermined CLV reference speed information.

In addition, the reproduction clock that is generated by the PLL disposed inside the data signal processing circuit 5 is the current rotation speed information of the spindle motor 2 at the time of reproducing data. Accordingly, by comparing the rotation speed information with the predetermined CLV reference speed information, the spindle error signal can be generated as well.

Then, the spindle servo circuit 12 performs the CLV rotation of the spindle motor 2 using the spindle driver 17 by outputting a spindle drive signal that is generated in accordance with the spindle error signal.

In addition, the spindle servo circuit 12 performs an operation of the spindle motor 2 such as startup, stop, acceleration, deceleration, or the like by generating a spindle drive signal in accordance with a spindle kick/brake control signal transmitted from the system controller 10.

In addition, the spindle servo circuit 12 can change the speed of rotation based on an instruction transmitted from the system controller 10.

For example, in a case where the linear speed during normal recording or reproduction is denoted by 1× speed, the system controller 10 can change the speed to 1× speed, 2× speed, 4× speed, 6× speed, 8× speed, 10× speed, 12× speed, 16× speed, 24× speed or the like.

The above-described various operations of the servo system and the recording and reproducing system are controlled by the system controller 10 that is configured by a microcomputer.

The system controller 10 performs various processes in accordance with a command supplied from the host device 100 through the host interface 8.

For example, in a case where a write command is output from the host device 100, the system controller 10, first, moves the optical pickup 1 to an address at which data is to be written. Then, the system controller 100 performs an encoding process for the user data (for example, video data, audio data, or the like) transferred from the host device 100 by using the encoding/decoding unit 7 as described above. Thereafter, as the laser driver 13 drives the laser emission in accordance with the data encoded as described above, recording is performed.

On the other hand, for example, in a case where a read command demanding to transfer data recorded on the optical disc 90 is supplied from the host device 100, the system controller 10 first controls a seek operation for the address instructed as a target. In other words, the system controller 10 instructs the optical block servo circuit 11 through a seek command. The system controller 10 allows the optical pickup 1 to perform an access operation for a designated address as a target through this instruction.

Thereafter, the system controller 10 performs operation control that is necessary for transferring the data included in an instructed data section to the host device 100. In other words, the system controller 10 reads out data from the disc 90, allows the data detection processing unit 5 and the encoding/decoding unit 7 to perform a reproduction process, and transfers the demanded data.

The RF signal acquired by the matrix circuit 4 is also supplied to the evaluation value measuring unit 19.

The evaluation value measuring unit 19 measures an evaluation value of the reproduced RF signal and supplies the evaluation value to the system controller 10 when an OPC operation to be described below is performed.

For example, the evaluation value measuring unit 19 measures a $\beta$ value, the degree of modulation, asymmetry, the amplitude of an RF signal, a jitter value, an aperture ratio, and the like.

Alternatively, an error rate may be used as the evaluation value. In such a case, information on the result of an error correcting process performed by the encoding/decoding unit 7 is supplied to the evaluation value measuring unit 19, and an error rate is calculated.

Here, the $\beta$ value is a value that is acquired based on a peak value Ip and a bottom value Ib of the reproduced RF signal by using "$\beta=(Ip+Ib)/(Ip-Ib)$".

In addition, the jitter value is represented as $\sigma/T$ by using a standard deviation $\sigma$ and 1T as a deviation from the defined clock. It can be stated that the greater the jitter value is, the further the reproduced signal is degraded. For a Blu-ray disc in which a recording layer is configured as one layer dedicated to reproduction, the jitter value is defined as being equal to or less than 6.5% in the specifications. It is preferable that the jitter value is low as can be.

Assuming that the peak value of a 8T signal is Ip8, the bottom value of the 8T signal is Ib8, the peak value of a 2T signal is Ip2, and the bottom value of the 2T signal is Ib2, the asymmetry is represented by $\{(Ip8+Ib8)-(Ip2+Ib2)\}/\{2(Ip8-Ib8)\}$. The asymmetry indicates the deviation between the center axes of the 8T signal and the 2T signal. This asymmetry is an index that is important for determining the binarized threshold. In the specifications of the Blu-ray disc, the asymmetry is defined as being in the range of −10% to 15%. However, ordinarily, the asymmetry is preferably in the range of 0% to 10%.

The degree of modulation is represented as (Ip8−Ib8)/(Ip8). This is the magnitude of the 8T amplitude and is an index that depends on the depth of the 8T pit. It can be stated that the greater this value is, further the C/N ratio is improved.

A memory unit 20 stores therein parameters, constants, and the like that are used for various processes by the system controller 10. For example, the memory unit 20 is configured by a non-volatile memory.

For example, the memory unit 20 is used as an area for storing a control target value that is used as a reference when a recording quality is determined by using an evaluation value at the time of recording data, which is to be described later, or a threshold value.

In addition, an example may be considered in which the memory 20 disposed inside the disc drive device is not used as the area for storing the control target value or the threshold value. In this example, since the system controller 10 can communicate with the host device 100, apart of a storage area arranged inside the host device 100 such as a memory, a hard disk, or the like may be used. Alternatively, a predetermined area of a loaded optical disc 90 may be used. For example, since an area that can be arbitrarily used by the disc drive device is arranged in a read-in area or the like of the optical disc 90, the area may be considered to be used.

In the example illustrated in FIG. 1, although the disc drive device connected to the host device 100 has been described, as a disc drive device according to an embodiment, a form that is not connected to other devices may be used. For example, an example in which the disc drive device includes an operation unit and a display unit, and the configuration of a data input/output interface portion is different from that illustrated in FIG. 1 may be considered. In other words, it is preferable that the disc drive device performs recording or reproduction in accordance with a user's operation and has a terminal unit used for input/output of various types of data formed therein. It is apparent that other various examples of the configuration of the disc drive device may be considered.

FIGS. 2A and 2B illustrate a schematic configuration of an optical disc 90. FIG. 2A illustrates a case where the optical disc 90 is viewed in a plane and illustrates the configuration of areas in the radial direction thereof.

The optical disc 90 is, for example, configured as a disc recording medium having a diameter of 12 cm, and the area structure thereof is broadly divided into an inner circumferential area 91, a data zone 92, and an outer circumferential area 93.

The data zone 92 is a main recording area, and so-called user data is recorded therein. The user data described here is main target data to be stored on the optical disc 90 such as video data, audio data, text data, computer use data or a software program.

The inner circumferential area 91 is used as a so-called management area. In the case of a one-layer disc in which the number of recording layers is one, the inner circumferential area 91 is an area that is used as a so-called read-in zone. In the case of a multi-layered disc in which the number of recording layers is two or more, the inner circumferential area is used as a read-in zone, an inner-zone, a read-out zone for each layer. In the inner circumferential area 91, physical information of the disc, setting information for a recording/reproducing operation, information used for managing the configuration or the alteration of the areas, a test writing area, and the like are formed.

The outer circumferential area 91 is an area that is used as a so-called a read-out zone in the case of a one-layer disc. In the case of a multi-layered disc in which the number of recording layers is two or more, the outer circumferential area is used as a read-out zone or an outer zone for each layer.

FIG. 2B schematically illustrates a layer structure in a case where the optical disc 90 is assumed as a four-layer Blu-ray disc.

In the optical disc 90, a concave-convex shape as wobbling grooves is formed on one face of a disc substrate PK that is molded through an injection molding or the like, for example, using polycarbonate or the like, a reflective film or a recording material layer is formed as a film, and a first recording layer L0 is formed.

In addition, an intermediate layer C1 is formed on the recording layer L0. On the face of the intermediate layer C1, a concave-convex shape as wobbling grooves is formed, and a semi-transmissive/reflective film or a recording material layer is formed thereon as a film, and a second recording layer L1 is formed.

Furthermore, an intermediate layer C2 is formed on the recording layer L1. On the face of the intermediate layer C2, a concave-convex shape as wobbling grooves is formed, and a semi-transmissive/reflective film or a recording material layer is formed thereon as a film, and a third recording layer L2 is formed.

In addition, on the recording layer L2, an intermediate layer C3 is formed. On the face of the intermediate layer C3, a concave-convex shape as wobbling grooves is formed, and a semi-transmissive/reflective film or a recording material layer is formed thereon as a film, and a fourth recording layer L3 is formed.

On the recording layer L3, a cover layer CV is formed.

In addition, in each of the recording layers L0, L1, L2, and L3, there is a portion such as a part of the inner circumferential area 91 in which an embossed pit row is formed.

In practice, the thickness of the optical disc 90 is about 1.2 mm, and the thickness of the disc substrate PK is about 1.1 mm. In addition, between a thickness of about 100 μm, from the recording layer L0 up to the cover layer CV are formed.

In FIG. 2B, although a case of a four-layer disc is illustrated as an example, a three-layer disc or a disc of five or more layers can be also formed so as to have a similar structure by adjusting the thickness or the like of the intermediate layer or the cover layer.

2. First Embodiment

The process of a disc drive device according to a first embodiment will be described with reference to FIG. 3.

In the description of each of embodiments presented below, the process will be described as the process of the system controller 10 from a time point when recording is started in accordance with a write command transmitted from the host device 100 after an optical disc 90 is loaded.

When the optical disc 90 is loaded, the system controller 10 performs a disc determining process. For example, the system controller 10 checks the disc type, the disc manufacturer, a unique ID that is unique to a disc, the disc closing state, and the like by reading out the management information of the optical disc 90. Accordingly, during recording, the system controller 10 has the type, the manufacturer, the unique ID, and the like of the loaded optical disc 90.

The process illustrated in FIG. 3 will now be described. The system controller 10 performs recording start control in Step F101 in accordance with a write command transmitted from the host device 100. For example, the system controller 10 controls an OPC (Optimum Power Calibration) operation so as to acquire the setting of optimal laser power or optimal laser driving pulse. Then, the system controller 10 instructs the write strategy unit 14 to set an optimal laser driving pulse and instructs the laser driver 13 to set optimal recording laser power.

In addition, the system controller 10 moves the optical pickup 1 to an address on the optical disc 90 to which data is to be written. Then, the system controller 10 allows the encoding/decoding unit 7 to perform an encoding process for user data transferred from the host device 100. Then, as the laser driver 13 drives the emission of laser beams in accordance with the encoded data, whereby recording is performed.

As above, after a recording operation is started, the system controller 10 monitors an interrupt timing in Step F102 until the recording on the basis of the write command is determined to be completed in Step F109.

Here, the interrupt timing is a timing at which the recording operation demanded by the write command is temporarily interrupted and the process of Step F104 and after that is performed.

As the interrupt timing, the system controller 10 monitors at least one of the amount of recorded data, the address of recording data, information of a recording position on the optical disc 90, a recording time, temperature, a correction value (the amount of tilt correction, the amount of aberration, or the like) that is used for compensation at various radiuses, the recording laser power, and the servo state during recording.

For example, the system controller 10 monitors the amount of recorded data during a recording operation. For example, in a case where the recording operation is interrupted every time the amount of data that is integral multiples of an error correction block (ECC block) as a recording data unit is recorded, the system controller 10 determines the interrupt timing by monitoring the amount of recorded data.

In addition, the system controller 10 may determine an interrupt timing every time recording corresponding to a predetermined length of the address is performed by monitoring the current address of the optical disc 90 at which data is currently recorded.

The system controller 10 may determine the interrupt timing every time recording corresponding to a predetermined radial range is performed by monitoring the radial position on the optical disc 90 at which data is recorded.

In addition, the system controller 10 may determine the interrupt timing every time predetermined time of a recording operation elapses by performing time counting from a time point when the recording operation is started (resumed).

The system controller 10 may determine the interrupt timing when a temperature change of predetermined temperature or higher from a certain time point, for example, a start time point of a recording operation is detected by monitoring the temperature information supplied from the sensor 21.

In addition, the system controller 10 may determine the interrupt timing when a predetermined change or more in the correction value is detected by monitoring a correction value such as a tilt correction amount or the amount of aberration correction as the correction value used for compensation for each of various radial positions.

In a case where the system controller 10 appropriately adjusts the recording power through optimal control of the recording laser power, the system controller 10 may determine the interrupt timing by detecting a predetermined change or more in the recording laser power.

Furthermore, the system controller 10 may determine the interrupt timing based on the rise in the error signal level, the frequency of the servo misalignment, or the like by monitoring the servo state of a focus servo, a tracking servo, or the like during recording.

The system controller 10 determines the interrupt timing through such any of the above-described monitoring processes or a multiple monitoring processes. An example of the multiple monitoring process is a process in which the interrupt timing is basically set every time data corresponding n×ECC blocks is recorded, and a case where there is a change in the temperature is also set as the interrupt timing.

In each example of the embodiments, by sequentially interrupting the process during recording and performing a linear speed change or correction corresponding to the recording state in the process of Step F104 and after steps that to be described later, the recording quality is stabilized. From that point of view, although it is preferable that the interrupt is made at fine intervals, when the process is interrupted too frequently, time until the completion of the recording operation is lengthened. Accordingly, the interrupt timing determining process may be determined in consideration of an appropriate recording time length and the stabilization of the quality.

When it is the interrupt timing, the system controller 10 proceeds from Step F102 to Step F103 and a recording operation that is performed by the encoding/decoding unit 7, the write strategy unit 14, the laser driver 13, the optical pickup 1, and the like is interrupted.

Then, the process proceeds to Step F104, and the system controller 10 performs control of the reproduction of a recorded portion and acquires the evaluation value.

In other words, the system controller 10 controls the optical pickup 1 to read out recording data of at least one ECC block or more at a recording position immediately before the interrupt. For example, recording data corresponding to n×ECC blocks, one track circulation along the radius of the disc, an arbitrary length for each rotation angle of the disc, or the like is reproduced.

Then, the system controller 10 fetches the evaluation value (a β value, the degree of modulation, a jitter value, an error rate, or the like, or a combination thereof) acquired by the evaluation value measuring unit 19 during the reproduction operation.

In Step F105, the system controller 10 calculates the variation in the recording quality by using the fetched evaluation value.

Here, the variation in the recording quality (hereinafter, briefly referred to as a "variation") may be a difference between the fetched evaluation value and a target value, a control value (correction value) used for a correction operation (for example, laser power correction, laser driving pulse correction, or the like) that is performed so as to eliminate the difference, or the like. Here, for the simplification of the description, the variation is described as a difference between the evaluation value and the target value.

For example, it is assumed that there is a target value $\beta_t$ to be originally acquired as a β value. In contrast to the target value, the current β value is denoted by $\beta_c$. Then, the variation may be a value of $\beta_c - \beta_t$ or $\beta_c/\beta_t$.

In addition, the value of the variation may be, for example, a value that is calculated through approximation calculation from data such as the acquired β value or may be calculated after numeric calculation such as calculation of a different between a maximum value and a minimum value, a moving average, or the like. Furthermore, the variation may be calculated by a circuit that uses a peak-bottom detection method or the like.

For example, the system controller 10 determines whether or not the value of the variation is within a threshold value that represents a predetermined range of the variation in the recording quality in Step F106.

In a case where the value of the variation is within the threshold value, the system controller 10 determines that the current recording quality is not degraded or is slightly degraded (the variation in the recording quality is within a predetermined range).

On the other hand, in a case where the value of the variation exceeds the threshold value, the system controller 10 determines that the current recording quality relatively tends to be degraded (the variation in the recording quality is out of the predetermined range).

Here, the target value used for calculating the variation or the threshold value used for determining whether or not the variation is within a predetermined range may be stored, for example, in the memory 20, so that the system controller 10 can refer thereto in Steps F105 and F106.

Here, the target value and the threshold value are not set as one type but set as various types and are stored. For example, the target value and the threshold value may be set as follows in correspondence with a certain evaluation value.

The target value and the threshold value are set for each disc type and specification.

The target value and the threshold value are set for each disc manufacturer.

The target value and the threshold value are set for each disc.

The target value and the threshold value are set for each linear speed during recording.

The target value and the threshold value are set for each layer of the recording layers.

The target value and the threshold value are set for each recording radial position.

It is apparent that a combination of the above-described examples may be used.

The examples include the following.

The target value and the threshold value are set for each disc manufacturer in addition to each disc type/specifications.

The target value and the threshold value are set for each linear speed during recording in addition to the disc type/specifications.

The target value and the threshold value are set for each recording radial position in addition to the disc type/specifications.

The target value and the threshold value are set for each the disc type/specifications, each disc manufacturer, and each linear speed during recording.

In a case where the threshold value is set for each linear speed, it may be considered such that the higher the linear speed is, the more difficult value the threshold value has. In other words, the threshold value is set to be more difficult (loosely) in proportion to the recording and reproduction linear speed.

In addition, the threshold value may be set to be more difficult (loosely) in proportion to the frequency of the reference clock, which is defined by each specification, corresponding to the recording and reproduction linear speed.

As above, the target value and the threshold value corresponding to the evaluation value used for an evaluation are stored in the memory 20 in accordance with the type or the like. Then, the system controller 10 reads out the target value and the threshold value corresponding to the optical disc 90 as a current target or the state of the recording operation in Step F105 from the memory 20 so as to be used for the process.

Since the disc type, the disc manufacturer, the disc ID, and the like are determined when a disc is loaded, the system controller 10 can read out the target value and the threshold value corresponding to the disc type or the like. In addition, since the recording linear speed, the recording layer, and the radial position are those of the recording operation performed immediately before the current recording operation, the system controller 10 can read out the target value and the threshold value corresponding to those.

In addition, it is described as above that the target value and the threshold value may be stored not in the memory 20 but in the host device 100 or the optical disc 90. In a case where the target value and the threshold value are stored in the host device 100, the system controller 10 may communicate with the host device 100 in Step F105 so as to demand transmission of the corresponding target value and the corresponding threshold value.

Furthermore, in a case where the target value and the threshold value are stored in the optical disc 90, the target value and the threshold value for each linear speed, each recording layer, each radial position, or the like may be read out, for example, during loading of a disc, be loaded in the memory 20 or internal register of the system controller 10, and be read out at the time point of Step F105.

In a case where the variation is determined to be within the threshold value in Step F106, the system controller 10 proceeds to Step F107 and controls resuming the interrupted recording operation. In other words, since continuation of recording at the current linear speed does not cause any problem, the recording is resumed in the state that is the same as that before the interrupt. Then, the process is returned back to a monitoring loop of Steps F102 and F109.

On the other hand, in a case where the variation is determined to be out of the threshold value in Step F106, the system controller 10 proceeds to Step F108 and controls decreasing the linear speed. In other words, since it is difficult to maintain the recording quality at the current linear speed, the recording linear speed (and the reproduction linear speed at the next interrupt) is decreased.

For example, in the case of a device that can be switched to 1× speed, 2× speed, 4× speed, 6× speed, 8× speed, 10× speed, 12× speed, 16× speed, or 24× speed, when the recoding and reproduction are currently performed at the 16× speed, the system controller 10 controls switching to the 12× speed that is lower by one step.

Specifically, a speed instruction or a change of the clock system for the spindle servo circuit 12, changes of various servo coefficients corresponding to the speed for the optical block servo circuit 11, and the like are controlled.

Thereafter, the recording operation that has been interrupted in Step F107 is resumed. When the recording operation is resumed, the recording operation is resumed, for example, in the state in which the linear speed is decreased. Then, the process is returned back to the monitoring loop of Steps F102 and F109.

Thereafter, the system controller 10 also performs the process of Steps F103 to F108 at each interrupt timing. Then, when a series of the recording operation demanded by the write command transmitted from the host device 100 is completed, the process proceeds from Step F109 to Step F110, and recording operation completing control is performed so as to end the recording process illustrated in FIG. 3.

According to the recording control process of the first embodiment, when the recording quality is degraded, for example, due to variations in the media characteristics for each manufacturer of the optical recording medium, warping in the radial direction or the tangential direction, face blurring, nonuniformity of sensitivity, distortion, eccentricity, mass eccentricity, or birefringence, servo characteristics, tilt adjustment error, mechanical assembly error, variations in viewing field characteristics, stray light, optical aberration of an optical pickup, remaining perturbations after adjustment of various perturbations, and electrical offset in an LSI or an electric circuit, various environmental variation factors such as an increase in the temperature inside a device, a change over time, temperature, humidity, or the like, the linear speed is decreased. Accordingly, the influence of such factors is decreased, whereby a recording operation capable of maintaining the recording quality can be performed.

Particularly, the recording operation is sequentially interrupted so as to perform the process of Steps F103 to F108, the promotion of the quality degradation in the process of the recording operation can be prevented. The recording quality during recording is consistently checked, and accordingly, the degradation of the recording quality can be determined and be responded regardless of the factor that influences the degradation of the recording quality.

In addition, regarding the setting of the threshold value that is used for determining that the variation is out of the predetermined range in the determination made in Step F106, a value that is determined to be "a level at which the current recording quality is allowable but there is a high possibility that unallowable degradation of the quality occurs in a case where the recording is continued in this state" is used, severe degradation of the quality during recording can be avoided.

As above, by gradually decreasing the recording linear speed as is necessary during the recording operation, the recording and reproduction can be continued with a stable recording quality, whereby the occurrence of an error can be prevented in advance. In addition, accordingly, the recording and reproduction can be continued in a stable servo state, which is also effective for preventing the occurrence of an error.

Furthermore, through such stabilization, the recording and reproduction can be continued with high performance. Accordingly, the possibility that the recording operation according to a write command is precisely completed in a speedy manner is high.

In Step F108, the linear speed decreasing control is performed. However, in the case of the 1× speed (the lowest linear speed), the linear speed decreasing control is not performed further.

In addition, in Step F108, for example, although the linear speed is decreased by one step each time, the linear speed may be decreased by two steps or more. For example, when the current linear speed is 16× speed, the linear speed is decreased up to the 8× speed. Furthermore, the number of decreased steps may be determined based on the magnitude of the variation.

Furthermore, in a case where the process proceeds to Step F108, a process of decreasing the linear speed up to 1× speed regardless of the current speed may be considered.

3. Second Embodiment

The process of a system controller according to a second embodiment will be described with reference to FIG. 4. In the description of second to eighth embodiments, the same step number is assigned to the same process as that described in advance, and duplicate description thereof will be avoided.

As illustrated in FIG. 4, Steps F101 to F106 and Steps F107 to F110 are the same as those described with reference to FIG. 3. In the case of FIG. 4, Steps F111 and F112 are added to the process illustrated in FIG. 3.

In a case where the variation is not within the threshold value in Step F106, the system controller 10 performs the linear speed decreasing control in Step F108 and then performs recording resuming control in Step F107.

On the other hand, in a case where the variation is within the threshold value in Step F106, the system controller 10 proceeds to Step F111, and it is determined whether a correction process is necessary.

The correction process described here is a correction process relating to a recording operation. In other words, in order to improve the recording quality, the correction process is a process of correcting parameters relating to various recording operations.

For example, as laser power correction, there is correction in which the recording laser power is optimized.

In addition, as correction of the laser driving pulse, there is correction through adjustment of pulse edge timing of a laser driving pulse or adjustment of a pulse level.

Furthermore, there is correction of radial tilt. Although not shown in FIG. 1, the entire optical pickup 1 or an objective lens arranged inside the optical pickup 1 is configured so as to be able to control the tilt state with respect to an optical disc 90 by using a tilt mechanism not shown in the figure. By adjusting the tilt mechanism, the vertical relationship between a recording layer of the optical disc 90 and the direction of the optical axis of incident laser beams is corrected.

In addition, correction of the aberration of the laser beams may be considered. In an optical system inside the optical pickup 1, a liquid crystal device or an expander that is used for correcting the spherical aberration is arranged on the optical path of the laser beams. The aberration is corrected by controlling these units.

Furthermore, correction of servo parameters such as servo offset values of the focus servo or the tracking servo may be considered.

In Step F111, the system controller 10 determines the necessity of correction, for example, based on whether the current variation is zero (or in a range that can be regarded almost zero) and the evaluation value approximately coincides with the target value or variation is present to some degree and within the threshold value.

In a case where the variation is almost zero, the correction is determined not to be necessary, and the system controller 10 performs recording resuming control in Step F107.

On the other hand, in a case where the variation is equal to or larger than a predetermined value, the process proceeds to Step F112, and the correction is performed. Then, after completion of the correction, the recording resuming control is performed in Step F107.

According to the second embodiment, in addition to the same advantages as those of the first embodiment, even when the variation (degradation) of the recording quality is within a predetermined range, the correction process is performed. Accordingly, the recording quality can be maintained by adaptively responding to the variation factors during recording. Therefore, the recording quality can be stabilized further.

In addition, by sequentially performing a correction process during recording, a possibility of forming a state in which the variation exceeds the threshold value can be decreased. In other words, the number of times of performing the linear speed decreasing control in Step F108 can be decreased, and thereby shortening of the recording time can be achieved.

Furthermore, since the correction of laser power or the correction of a laser driving pulse may be performed through a parameter instruction of the system controller 10 to the laser driver 13 and the write strategy unit 14, the correction thereof can be completed in extremely short time. On the other hand, a relatively long time is necessary for the tilt correction so as to execute the tilt control. Accordingly, it is preferable that laser power correction or laser driving pulse correction is performed as the correction performed in Step F112 from the viewpoint of shortening the interrupt time.

In addition, in a case where the correction process is performed as in the second embodiment, a correction value may be calculated in Step F105. In other words, in Step F105, while variation of the current evaluation value from the target value is acquired, a correction value (for example, a laser power correction value) corresponding to the variation is additionally calculated in the case.

In Step F106, it is determined whether the correction value is within the set threshold value. For example, a threshold value representing whether or not the characteristic variation is in a range in which the variation can be responded by correction may be used.

Then, in a case where the correction value is within the threshold value, the process proceeds to Step F112, and a process of correcting using the correction value is performed.

In a case where such a process is performed, the determination of performing the correction represented by Step F111 in FIG. 4 may be regarded as being substantially performed in Step F105 at a time point when the correction value is acquired. In other words, when correction value=zero, the correction is determined to be not necessary.

In addition, as the speed decreasing control of Step F108 according to the second embodiment, one-step decreasing control, multiple-step decreasing control, control for decreasing the speed to the 1× speed, or the like may be considered.

4. Third Embodiment

A third embodiment will be described with reference to FIG. 5.

Figure 5:
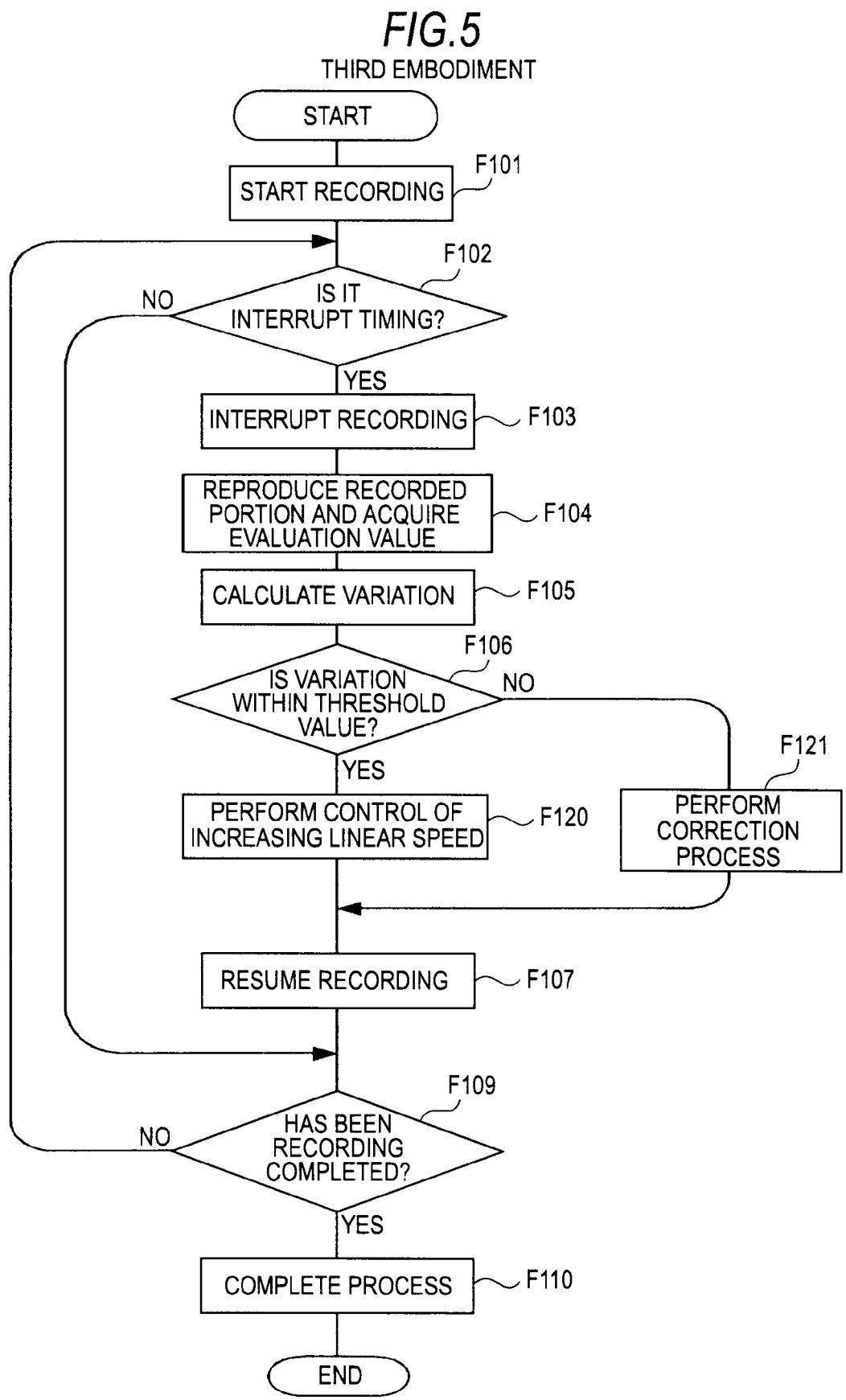
FIG. 5 is a flowchart of a recording process according to a third embodiment.

In FIG. 5, Steps F101 to F106, F107, F109, and F110 are the same as those illustrated in FIG. 3.

In the example of the process illustrated in FIG. 5, the system controller 10 performs control such that the recording and reproducing linear speed is increased in Step F120 in a case where the variation is within the threshold value in Step F106.

For example, in a case where recording/reproducing is currently performed at the 4× speed, control of changing the speed to the 6× speed that is higher by one step is performed.

Specifically, a speed instruction for the spindle servo circuit 12, a change of the clock system, changes in the various servo coefficients according to the speed of the optical block servo circuit 11, and the like are controlled.

Thereafter, the recording operation that has been interrupted in Step F107 is resumed. At the time of resuming the recording operation, for example, the recording is resumed in a state in which the linear speed is increased. Then, the process is returned back to the monitoring loop of Steps F102 and F109.

On the other hand, when the variation is not within the threshold value in Step F106, the system controller 10 performs a correction process in Step F121.

The correction process of this case is correcting the degradation of the recording quality, and as this correction process, for example, there are the laser power correction, the laser driving pulse correction, the tilt correction, and the servo parameter correction, which are described above, and the like. In this case, it is preferable that a correction operation demanding relatively long time such as the tilt correction is also performed.

After the completion of the correction process, the recording is resumed in Step F107. The recording linear speed is the same as that before the interrupt.

According to this third embodiment, when the degradation of the recording quality is checked, the parameters of the recording operation are corrected. In other words, during recording, the recording operation is sequentially corrected as is necessary, whereby the degradation of the recording quality can be prevented.

On the other hand, when the recording quality is good, the recording linear speed is increased. Accordingly, when stable recording is performed, the linear speed is increased so as to shorten the recording time.

Although the linear speed increasing control is performed in Step F120, when the linear speed is already the maximum linear speed, a process of further increasing the linear speed is not performed.

In addition, in Step F120, although the linear speed is increased, for example, by one step, the linear speed may be increased with an increase width of two or more steps. For example, when the current speed is 1× speed, the speed may be increased up to the 8× speed.

In addition, in a case where the process proceeds to Step F120, a process of increasing the speedup to the maximum speed regardless of the current speed may be considered.

Furthermore, as described in the second embodiment, it may be configured such that the correction value is calculated in Step F105, and it is determined whether the correction value is within the set threshold value in Step F106.

5. Fourth Embodiment

A fourth embodiment will be described with reference to FIG. 6.

Figure 6:
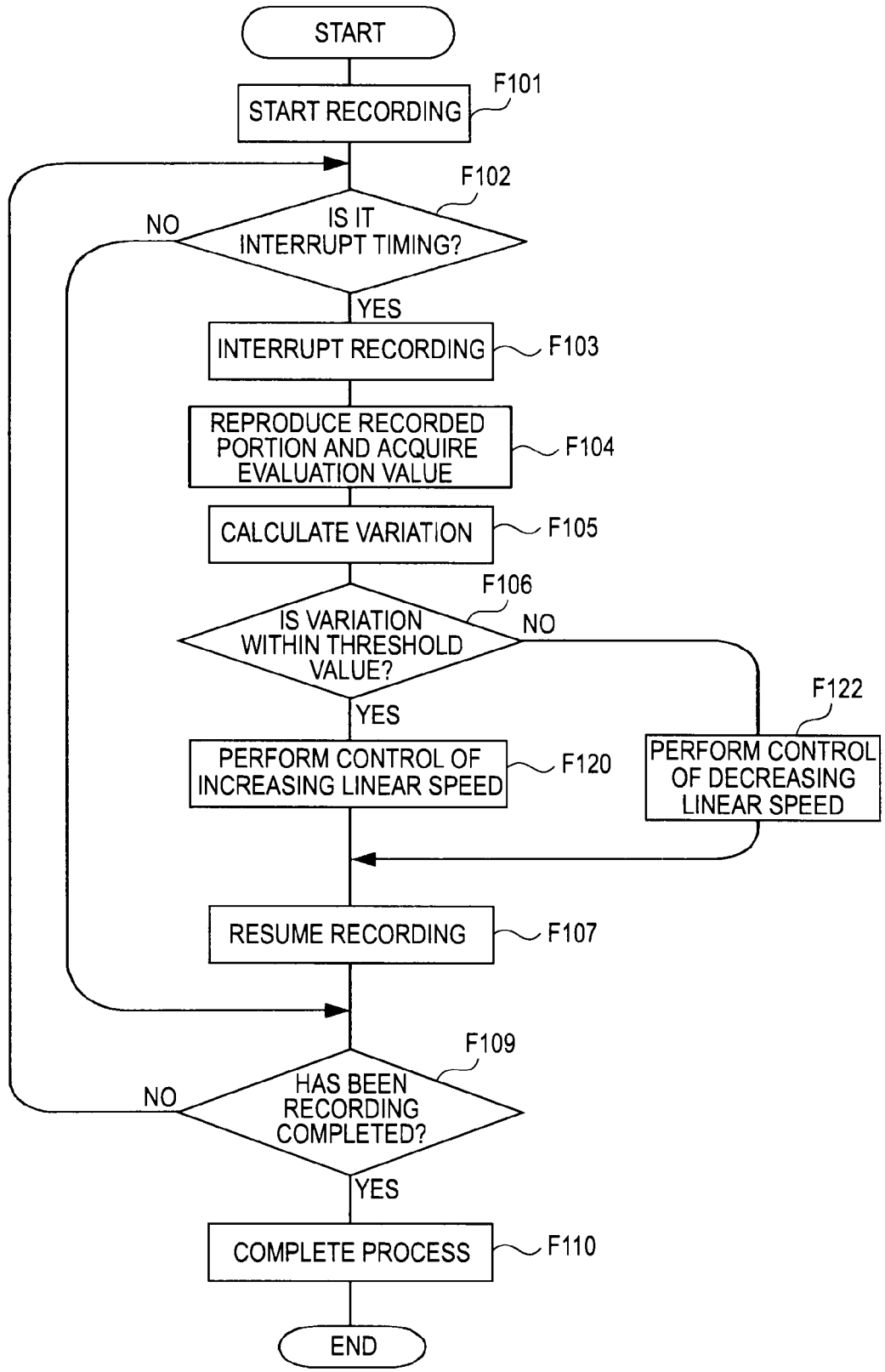
FIG. 6 is a flowchart of a recording process according to a fourth embodiment.

In FIG. 6, Steps F101 to F106, F107, F109, and F110 are the same as those illustrated in FIG. 3.

In the example of the process illustrated in FIG. 6, the system controller 10 performs control such that the recording and reproducing linear speed is increased in Step F120 in a case where the variation is within the threshold value in Step F106. Then, the recording is resumed at the linear speed increased in Step F107.

On the other hand, in a case where the variation is not within the threshold value in Step F106, the system controller 10 performs such control that the recording and reproducing linear speed is decreased in Step F122. Then, in Step F107 the recording is resumed at the linear speed decreased.

According to this fourth embodiment, when the degradation of the recording quality is checked, the recording/reproduction linear speed is decreased. Accordingly, the influence on the degradation of the recording quality due to variation factors is reduced, and the recording quality can be stabilized.

On the other hand, when the recording quality is good, the recording linear speed is increased. Accordingly, when stable recording is performed, the linear speed is increased so as to shorten the recording time.

In addition, as the speed decreasing control of Step F122 according to the fourth embodiment, one-step decreasing control, multiple-step decreasing control, decreasing control up to the 1× speed, or the like may be considered.

Similarly, as the speed increasing control of Step F120, one-step increasing control, multiple-step increasing control, control of increasing the speed up to the 1× maximum linear speed or the like may be considered.

6. Fifth Embodiment

A fifth embodiment will be described with reference to FIG. 7.

Figure 7:
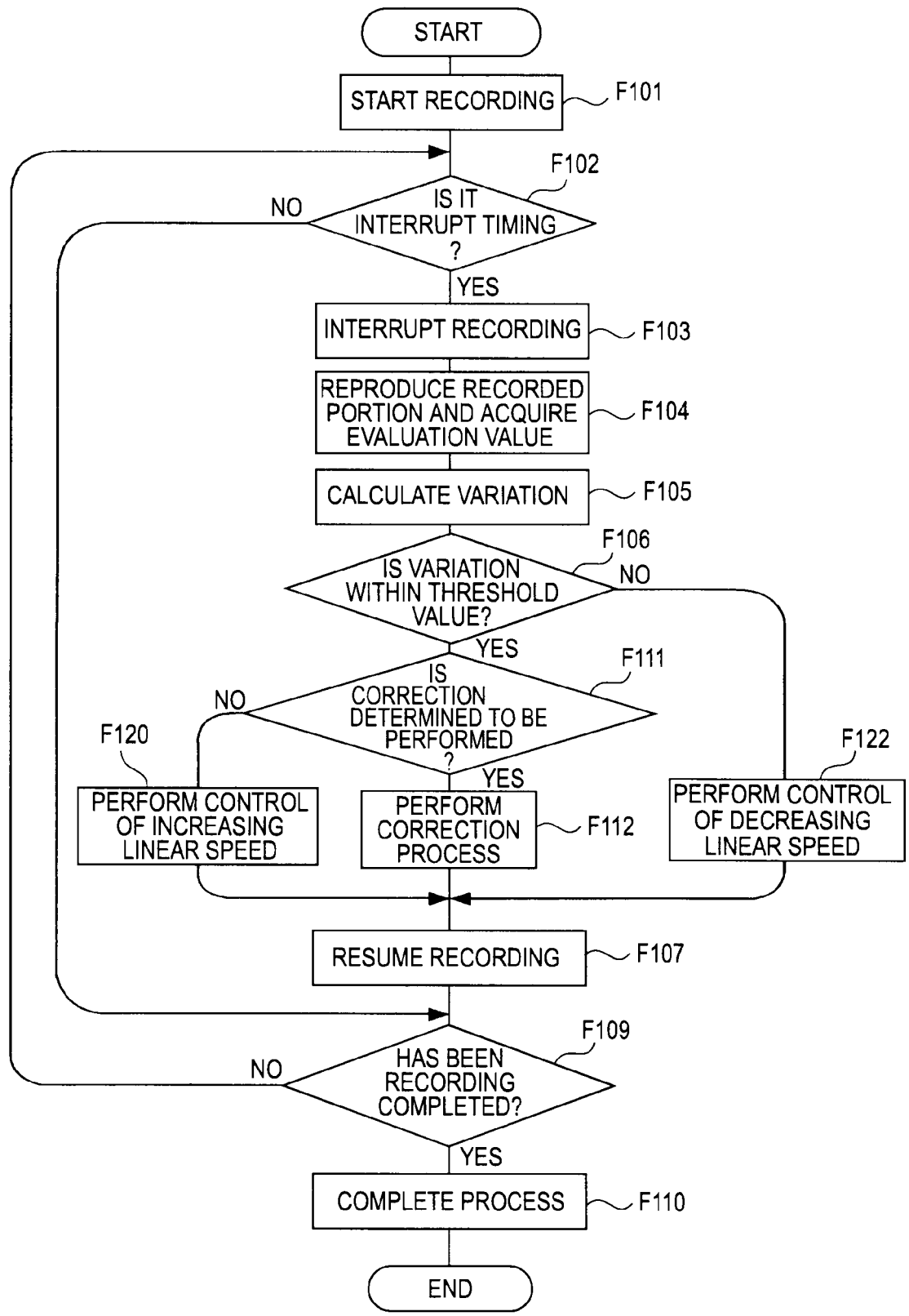
FIG. 7 is a flowchart of a recording process according to a fifth embodiment.

In FIG. 7, Steps F101 to F106, F107, F109, and F110 are the same as those illustrated in FIG. 3.

In the example of the process illustrated in FIG. 7, the system controller 10 proceeds to Step F111 in a case where the variation is within the threshold value in Step F106 and determines the necessity of correction.

In Step F111, the system controller 10 determines the necessity of correction, for example, based on whether the current variation is zero (or in a range that can be regarded almost zero) and the evaluation value approximately coincides with the target value or variation is present to some degree and within the threshold value.

In a case where the variation is equal to or larger than a predetermined value, the process proceeds to Step F112, and the correction is performed. Then, after completion of the correction, the recording resuming control is performed in Step F107.

In a case where the correction is not necessary, that is, in a case where the variation is almost zero, the system controller 10 proceeds to Step F120, and recording/reproducing linear speed increasing control is performed. Then, in Step F107 the recording is resumed at the linear speed increased.

On the other hand, in a case where the variation is not within the threshold value in Step F106, the system controller 10 performs such control that the recording and reproducing linear speed is decreased in Step F122. Then, in Step F107 the recording is resumed at the linear speed decreased.

According to this fifth embodiment, when the degradation of the recording quality is checked, the recording/reproduction linear speed is decreased. Accordingly, the influence on the degradation of the recording quality due to variation factors is reduced, and the recording quality can be stabilized.

On the other hand, when the variation of the recording quality is within the predetermined range, the correction process is performed so as to adaptively respond to the variation factors during recording, and accordingly, the recording quality can be maintained. Therefore, the recording quality can be stabilized further.

In addition, when the recording quality is quite good, the recording linear speed is increased. Accordingly, when stable recording is performed, the linear speed is increased so as to shorten the recording time.

In addition, as the speed decreasing control of Step F122 according to the fifth embodiment, one-step decreasing control, multiple-step decreasing control, decreasing control up to the 1× speed, or the like may be considered.

Similarly, as the speed increasing control of Step F120, one-step increasing control, multiple-step increasing control, control of increasing the speed up to the 1× maximum linear speed or the like may be considered.

Furthermore, as described in the second embodiment, it may be configured such that the correction value is calculated in Step F105, and it is determined whether the correction value is within the set threshold value in Step F106.

7. Sixth Embodiment

A sixth embodiment will be described with reference to FIG. 8.

Figure 8:
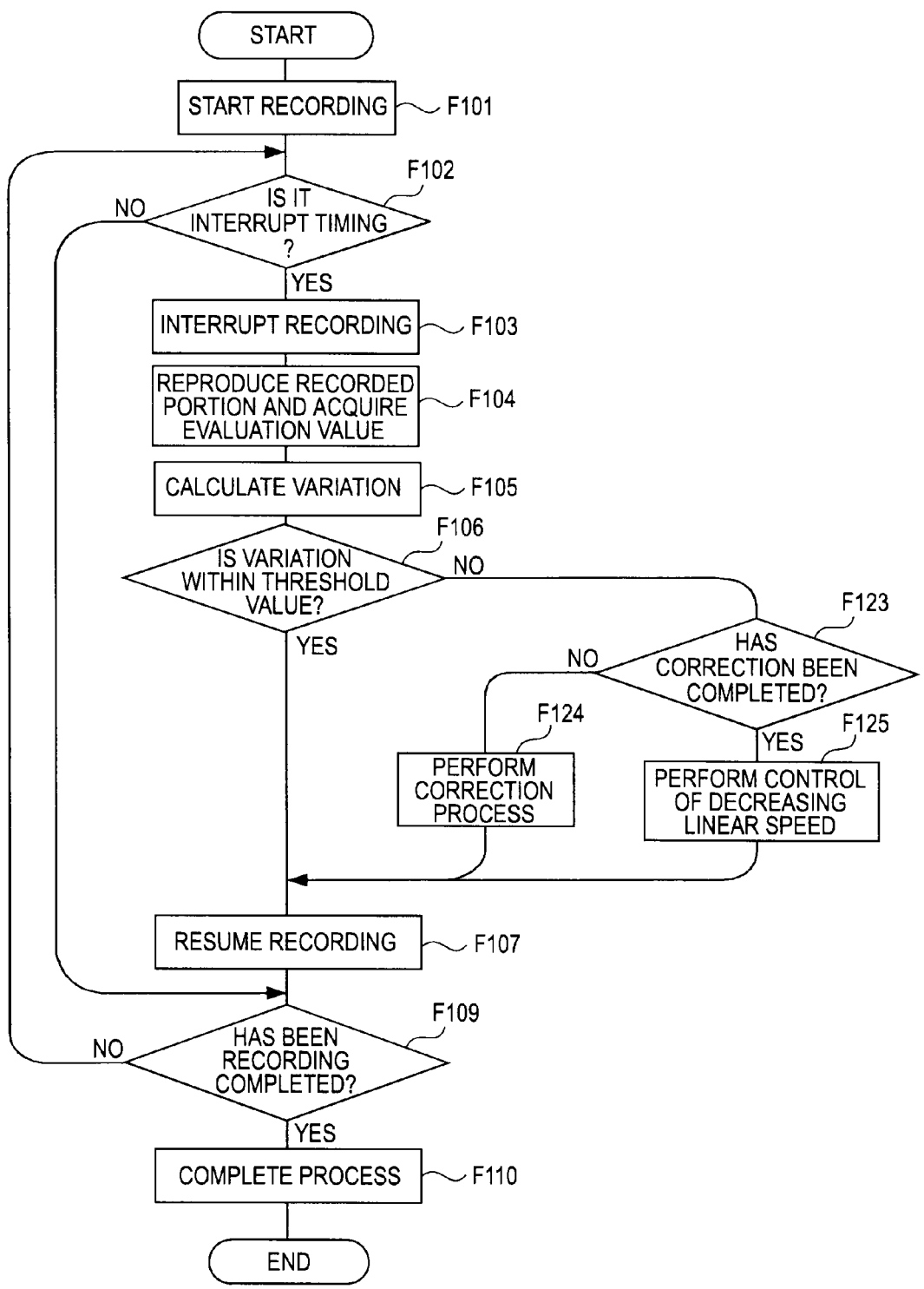
FIG. 8 is a flowchart of a recording process according to a sixth embodiment.

In FIG. 8, Steps F101 to F106, F107, F109, and F110 are the same as those illustrated in FIG. 3.

In the example of the process illustrated in FIG. 8, the system controller 10 directly resumes the recording in Step F107, in a case where the variation is within the threshold value in Step F106.

On the other hand, in a case where the variation is not within the threshold value in Step F106, the system controller 10 determines whether or not the correction has been completed in Step F123. This correction is a next correction process of Step F124.

When the recording is interrupted in the state of the recording linear speed until now, in a case where the correction process of Step F124 is performed up to a predetermined number of times of an upper limit, the process proceeds to Step F125. On the other hand, in a case where the correction process of Step F124 is not performed up to the number of times of the upper limit, the process proceeds to Step F124.

The number of times of the upper-limit may be appropriately set as one or a predetermined number of times.

In the case where the process proceeds to Step F124, the system controller 10 performs a correction process.

The correction process of this case is correcting the degradation of the recording quality, and as this correction process, for example, there are the laser power correction, the laser driving pulse correction, the tilt correction, and the servo parameter correction, which are described above, and the like. In this case, since the recording quality tends to be degraded, it is preferable that a correction operation demanding relatively long time such as the tilt correction is also performed.

After the completion of the correction process, the recording is controlled to be resumed in Step F107. The recording linear speed is the same as that before the interrupt.

In addition, in a case where the correction is performed in Step F124, for the determination of Step F123 thereafter, a flag process that indicates the completion of the correction and a process of counting the number of times of correction completion are performed.

In an interrupt time, in a case where a correction completion flag that indicates the completion of the correction in the previous Step F124 is set or the correction counter reaches the upper limit, the correction is determined to be in a completed state in the process of Step F123.

In such a case, the system controller 10 proceeds to Step F125, and control of decreasing the recording/reproducing linear speed is performed. Then, in Step F107, the recording is resumed in Step F107 at the linear speed decreased.

This is a process of responding by decreasing the linear speed to a case where the tendency of the recording quality degradation is not corrected even by performing correction.

According to this sixth embodiment, when the tendency of degradation of the recording quality is checked, first, the recording operation is corrected. In a case where it is difficult to prevent the tendency of quality degradation through correction, the recording/reproducing linear speed is decreased. By performing such a process, the recording quality is stabilized.

In addition, as the speed decreasing control of Step F125 according to the sixth embodiment, one-step decreasing control, multiple-step decreasing control, control for decreasing the speed to the 1× speed, or the like may be considered.

Furthermore, it may be configured such that the correction value is calculated in Step F105, and it is determined whether the correction value is within the set threshold value in Step F106.

In such a case, in Step F123, instead of determining whether or not the correction is in the completed state, it may be determined whether or not the calculated correction value is in a predetermined range, that is, within a range that can be responded through correction.

In other words, this is an example of a process in which, in a case where the correction value is within the range that can be responded through correction (or for which correction is appropriate), correction is performed in Step F124. In the example of the process, on the other hand, in a case where the correction value is not within the range that can be responded through correction, the linear speed is decreased in Step F125.

In FIG. 8, in a case where the variation (or the correction value) is within the threshold value in Step F106, the recording has been described to be resumed without performing any other process. However, the processes described in the second to fifth embodiments may be combined together.

In other words, in a case where the variation is within the threshold value, similarly to the second embodiment, it may be determined whether correction is to be performed, and the correction process may be performed as is necessary.

In addition, when the variation is within the threshold value, similarly to the third and fourth embodiments, control of increasing the recording/reproducing linear speed may be performed.

Furthermore, when the variation is within the threshold value, similarly to the fifth embodiment, the correction process or the control of increasing the recording/reproducing linear speed may be performed.

8. Seventh Embodiment

A seventh embodiment will be described with reference to FIG. 9.

Figure 9:
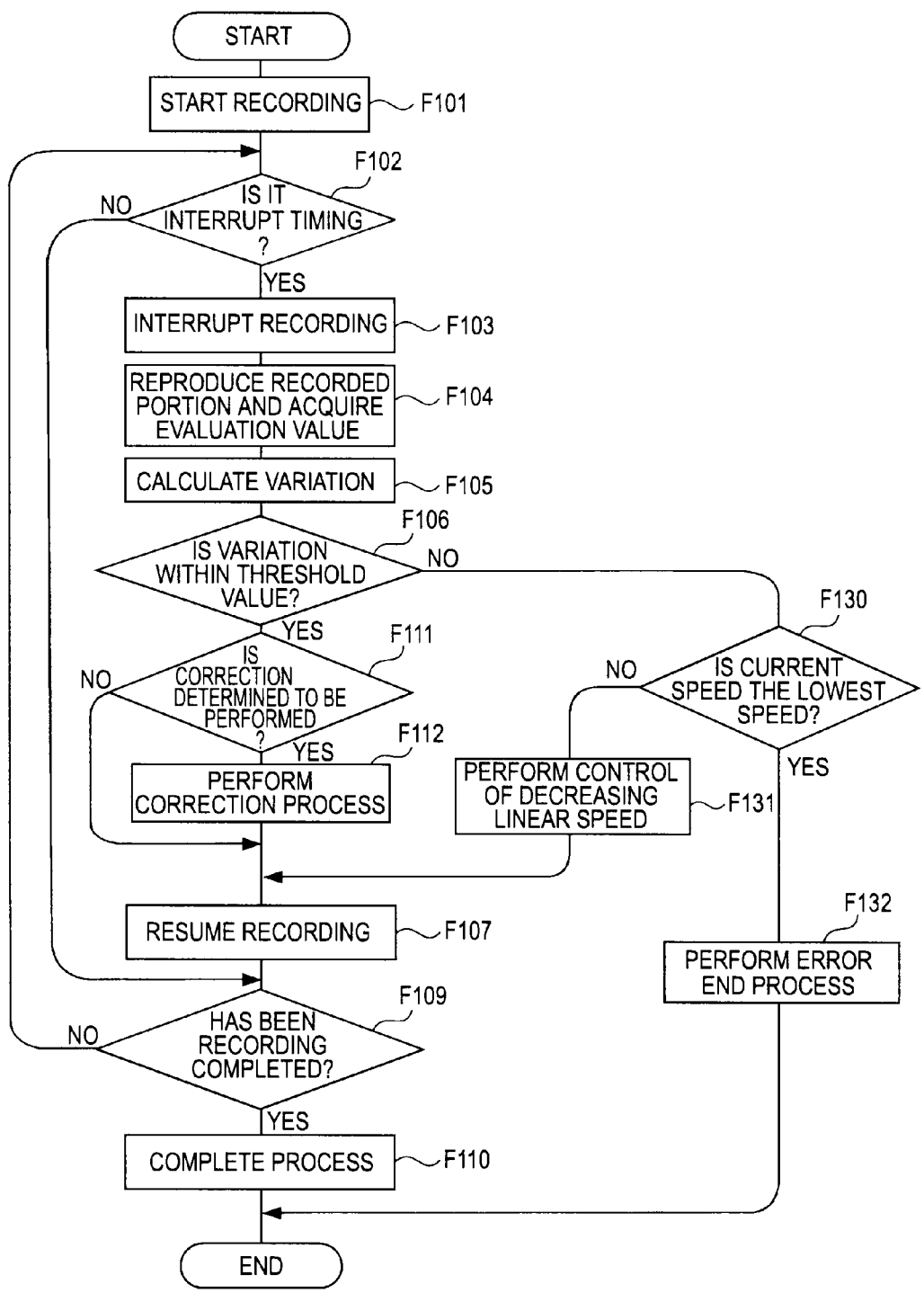
FIG. 9 is a flowchart of a recording process according to a seventh embodiment.

In FIG. 9, Steps F101 to F106, F107, F109, and F110 are the same as those illustrated in FIG. 3.

In an example of the process illustrated in FIG. 9, in a case where the variation is within the threshold value in Step F106, the system controller 10 determines the necessity of a correction process in Step F111, for example, based on whether the current variation is zero (or in a range that can be regarded almost zero) and the evaluation value approximately coincides with the target value or variation is present to some degree and within the threshold value.

In a case where the variation is almost zero, the correction is determined not to be necessary, and the system controller 10 performs recording resuming control in Step F107.

On the other hand, in a case where the variation is equal to or larger than a predetermined value, the process proceeds to Step F112, and a correction process such as laser power correction or laser driving pulse correction is performed. Then, after completion of the correction, the recording resuming control is performed in Step F107.

On the other hand, in a case where the variation is not within the threshold value in Step F106, the system controller 10 determines whether or not the current speed is the lowest linear speed (that is, the 1× speed) in Step F130.

In a case where the current speed is not the 1× speed, the process proceeds to Step F131, and the recording/reproducing linear speed is decreased. Then, the recording resuming control is performed in Step F107. Accordingly, the recording is resumed at the decreased linear speed.

In addition, as the speed decreasing control of Step F130, one-step decreasing control, multiple-step decreasing control, decreasing control up to the 1× speed, or the like may be considered.

In a case where the recording has been performed at the lowest linear speed until now, the system controller 10 proceeds from Step F130 to Step F132.

In this case, the system controller 10 ends the recording operation as an error end. The system controller 10 notifies the host device 100 of the error end. The host device 100 performs error notification for a user by using a display device, an LED, a liquid crystal panel or the like in response to the error end. It is apparent that the error notification may be performed through a display device of the disc drive device or an alarm sound.

Since it is difficult to perform the control of further decreasing the linear speed, it is determined that a situation occurs in which it is difficult to stabilize the recording quality even in a state in which the linear speed is decreased to be the lowest. Thus, the recording operation ends without being completed, and the process is transferred to later handling.

According to this sixth embodiment, the recording quality can be stabilized through decreasing of the linear speed or the correction process. Moreover, in a situation in which it is difficult to avoid the quality degradation even the recording is resume, the error end is forcibly performed, and accordingly, unnecessary resuming of the recording process can be avoided.

In addition, when the current speed is determined as the lowest speed in Step F130, it may be configured that, first, a correction process is performed, and then the recording operation is resumed. Then, in a case where the degradation of the recording quality appears in the recording after the correction (out of the threshold value in Step F106), performing error end is considered.

Furthermore, in the seventh embodiment, it may be configured such that the correction value is calculated in Step F105, and it is determined whether the correction value is within the set threshold value in Step F106.

In FIG. 9, in a case where the variation (or the correction value) is within the threshold value in FIG. 106, the following process may be performed.

In a case where the variation is within the threshold value, similarly to the first embodiment, the recording may be directly resumed without performing any other process.

In addition, in the case where the variation is within the threshold value, similarly to the third and fourth embodiments, the control of increasing the recording/reproducing linear speed may be performed.

Furthermore, in the case where the variation is within the threshold value, similarly to the fifth embodiment, a correction process or the control of increasing the recording/reproducing linear speed may be performed.

9. Eighth Embodiment

An eighth embodiment will be described with reference to FIG. 10.

Figure 10:
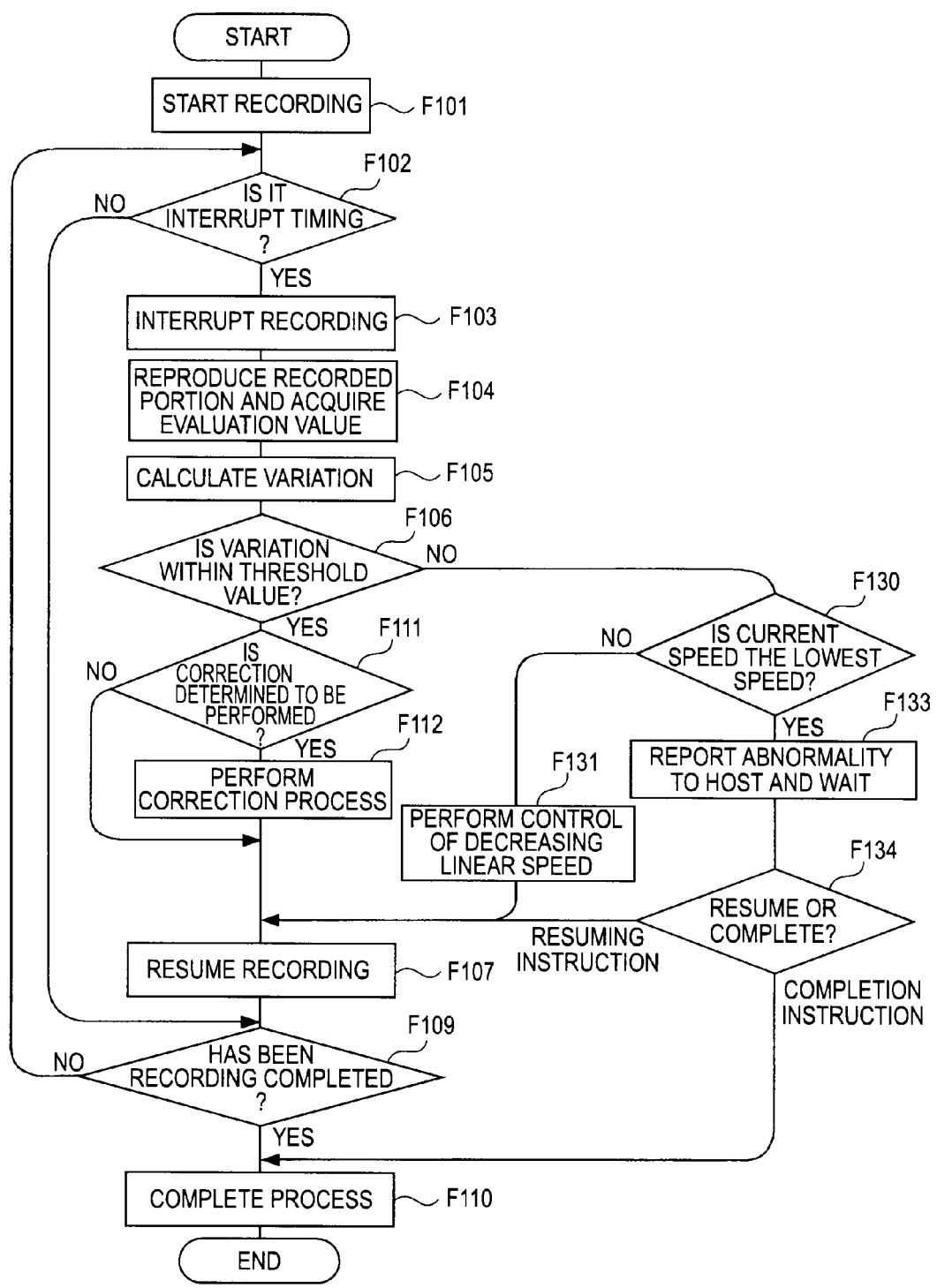
FIG. 10 is a flowchart of a recording process according to an eighth embodiment.

Although the process illustrated in FIG. 10 is basically the same as that illustrated in FIG. 9, the process performed when the current speed is determined to be the lowest linear speed in Step F130 is different from that illustrated in FIG. 9.

In a case where the recording had been performed at the lowest speed until now, and the variation is out of the threshold value in Step F106, the system controller 10 proceeds from Step F130 to F133.

In this case, the system controller 10 reports abnormality to the host device 100 and waits for an instruction from the host device 100.

Then, in a case where a resuming instruction is transmitted from the host device 100, the process proceeds from Step F134 to Step F107, and the recording is resumed. In other words, the recording is resumed with the lowest linear speed maintained.

However, in a case where a completion instruction is transmitted from the host device 100, the process proceeds from Step F134 to Step F110, and the recording operation is completed.

In this eighth embodiment, in a case where a situation occurs in which it is difficult to stabilize the recording quality even in a state in which the linear speed is decreased to the lowest speed, whether or not the recording operation is resumed depends on the determination of the host device 100 (the determination of an application that operates in the host device 100). Accordingly, the resuming process or the process of the error end is performed depending on the situation of the host device 100 side.

In addition, when the current speed is determined to be the lowest linear speed in Step F130, it may be configured that, first, a correction process is performed, and the recording operation is resumed. Then, in a case where the degradation of the recording quality appears in the recording after the correction (out of the threshold value in Step F106), abnormality may be considered to be reported to the host device 100 in Step F133.

Furthermore, in this eighth embodiment, it may be configured such that the correction value is calculated in Step F105, and it is determined whether the correction value is within the set threshold value in Step F106.

In FIG. 10, in a case where the variation (or the correction value) is within the threshold value in FIG. 106, the following process may be performed.

In a case where the variation is within the threshold value, similarly to the first embodiment, the recording may be directly resumed without performing any other process.

In addition, in the case where the variation is within the threshold value, similarly to the third and fourth embodiments, the control of increasing the recording/reproducing linear speed may be performed.

Furthermore, in the case where the variation is within the threshold value, similarly to the fifth embodiment, a correction process or the control of increasing the recording/reproducing linear speed may be performed.

10. Modified Example

As above, although various embodiments have been described, as the examples of the process of the present disclosure, other various modified examples may be considered.

In the process of each of the above-described embodiments, when the control of increasing the linear speed is performed, the correction process relating to the above-described recording operation may be performed together. By increasing the linear speed after correction, the recording quality after the increase of the linear speed can be stabilized.

In addition, in the process of each of the above-described embodiments, when the control of decreasing the linear speed is performed, the correction process may be performed together. By decreasing the linear speed after correction, the recording quality after the decrease of the linear speed can be stabilized.

As the determination of the interrupt timing of Step F102 illustrated in FIGS. 3 to 10, various examples other than the above-described examples may be considered. In addition, the method of determining the interrupt timing may be considered to be selected by a user. For example, a user is allowed to determine to give high priority to either the shortening of the recording time or stabilization of the recording quality, and in a case where the stabilization of the recording quality has high priority, a process in which the recording interrupt timing frequently occurs is performed as possibly as can be.

In the embodiment, examples in which the recording device of the present disclosure are realized by a disc drive device for an optical disc of a DVD type or a Blu-ray type have been described. However, the present disclosure may be applied to a recording device for other types of optical recording media. For example, the present disclosure may be applied to a recording device that records information by emitting laser beams to an optical card.

In addition, the present disclosure may be applied to a recording device other than the recording devices for optical recording media. For example, the present disclosure may be applied to a recording device that performs magnetic recording.

11. Program

A program according to an embodiment is a program that allows an operation processing device (the system controller 10 or the like) to perform the process (or the process of a modified example thereof) illustrated in FIGS. 3 to 10 described above.

The program according to an embodiment allows the operation processing device to perform an information recording operation for an optical recording medium such as the optical disc 90 through laser beam emission.

In addition, the program allows the operation processing device to perform interrupting the recording operation at predetermined interrupt timing during the recording operation, reproducing the recorded portion, and acquiring an evaluation value of the recording quality.

Furthermore, the program allows the operation processing device to perform determining the recording quality using the evaluation value, changing the recording linear speed based on the determination result, and resuming the recording operation.

The program according to this embodiment may be recorded in advance in an HDD as a recording medium that is built in a device such as a disc drive device, an optical card recording device, a personal computer, or the like, a ROM or the like arranged inside a microcomputer that has a CPU.

Alternatively, or additionally, the program may be stored (recorded) temporarily or perpetually on a removable recording medium such as a flexible disk, a CD-ROM (Compact Disc Read Only Memory), an MO (Magnet optical) disc, a DVD, a Blu-ray disc, a magnetic disk, a semiconductor memory, or a memory card. Such a removable recording medium can be provided as so-called package software.

In addition, the program may be installed to a personal computer or the like from a removable recording medium or may be downloaded from a download site through a network such as a LAN (Local Area Network) or the Internet.

This program is appropriate for realizing a recording device and a recording method that perform the process of each of the above-described embodiments and for provision thereof in a broad range.

The present application contains subject matter related to that disclosed in Japanese Priority Patent Application JP 2010-133588 filed in the Japan Patent Office on Jun. 11, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device comprising:
   a recording and reproducing unit that records or reproduces data stored on a recording medium; and
   a control unit that interrupts recording during recording performed by the recording and reproducing unit, acquires an evaluation value of a recording quality of a recorded portion, changes recording speed based on the evaluation value, and resumes the recording,
   wherein the control unit, upon determination that the variation of the recording quality on the basis of the evaluation value is out of the predetermined range, decreases the recording speed of the recording and reproducing unit and resumes the recording upon determination that the recording before the interrupt is not performed at a lowest recording speed.

2. The recording device according to claim 1, wherein the control unit increases the recording speed of the recording and reproducing unit and resumes the recording upon determination that the variation of the recording quality on the basis of the evaluation value is within the predetermined range.

3. The recording device according to claim 1, wherein the control unit corrects a recording operation of the recording and reproducing unit and resumes the operation upon determination that the variation of the recording quality on the basis of the evaluation value is within the predetermined range.

4. The recording device according to claim 1, wherein after the recording is interrupted, the control unit ends the recording of the recording and reproducing upon determination that the recording before the interrupt is performed at the lowest recording speed.

5. The recording device according to claim 1, wherein after the recording is interrupted, the control unit performs a notification of an abnormal state upon determination that the recording before the interrupt is performed at the lowest recording speed.

6. The recording device according to claim 1, wherein the control unit increases the recording speed of the recording and reproducing unit and resumes the recording operation upon determination that the variation of the recording quality on the basis of the evaluation value is within the predetermined range.

7. The recording device according to claim 6, wherein the control unit corrects the recording operation of the recording and reproducing unit and resumes the recording upon determination that the variation of the recording quality on the basis of the evaluation value is out of the predetermined range.

8. The recording device according to claim 1,
   wherein the recording medium is an optical recording medium, and
   wherein the control unit, to determine timing for interrupting the recording, monitors at least one of an amount of recorded data, an address of recording data, a recording position located on the optical recording medium, recording time, temperature, a correction value for each of various radiuses, laser power, and a servo state.

9. The recording device according to claim 1,
   wherein the recording medium is an optical recording medium, and
   wherein the control unit acquires at least one of a jitter value, an error rate, a β value, a degree of modulation, asymmetry, an amplitude of an RF signal, and an aperture ratio as the evaluation value.

10. The recording device according to claim 1, further comprising:
    a memory unit that stores therein a threshold value used for determining whether or not the variation of the recording quality on the basis of the evaluation value is within the predetermined range,
    wherein the control unit performs the determination by using the acquired evaluation value and the threshold value.

11. The recording device according to claim 1, wherein the control unit acquires a threshold value used for determining whether or not the variation of the recording quality on the basis of the evaluation value is within a predetermined range from a part of an area of the recording medium as a recording target or a memory unit of any other device connected thereto and performs the determination by using the evaluation value and the threshold value.

12. A recording method comprising the steps of:
    recording, by a recording and reproducing unit, data on a recording medium;
    interrupting, by a control unit, the recording during recording;
    acquiring an evaluation value of a recording quality;
    changing recording speed based on the evaluation value; and
    resuming the recording,
    wherein the control unit, upon determination that the variation of the recording quality on the basis of the evaluation value is out of the predetermined range, decreases the recording speed of the recording and reproducing unit and resumes the recording upon determination that the recording before the interrupt is not performed at a lowest recording speed.

13. A non-transitory computer readable recording medium having instructions stored therein, which when executed by a processor in an operation processing device, causes the processor to implement a method comprising the steps of:
    recording, by a recording and reproducing unit, data on a recording medium;
    interrupting, by a control unit, the recording during recording;
    acquiring an evaluation value of a recording quality;
    changing recording speed based on the evaluation value; and
resuming the recording,
    wherein the control unit, upon determination that the variation of the recording quality on the basis of the evaluation value is out of the predetermined range, decreases the recording speed of the recording and reproducing unit and resumes the recording upon determination that the recording before the interrupt is not performed at a lowest recording speed.

* * * * *